(12) United States Patent
Barak et al.

(10) Patent No.: US 12,368,668 B2
(45) Date of Patent: Jul. 22, 2025

(54) HIGHLY-AVAILABLE CLUSTER LEADER ELECTION IN A DISTRIBUTED ROUTING SYSTEM

(71) Applicant: DRIVENETS LTD., Ra'anana (IL)

(72) Inventors: Amir Barak, Ra'anana (IL); Or Sadeh, Pardes-Hanna (IL); Idan Matityahu, Tel Aviv (IL)

(73) Assignee: DRIVENETS LTD., Ra'anana (IL)

( * ) Notice: Subject to any disclaimer, the term of this patent is extended or adjusted under 35 U.S.C. 154(b) by 37 days.

(21) Appl. No.: 18/001,021

(22) PCT Filed: May 31, 2021

(86) PCT No.: PCT/IL2021/050640
§ 371 (c)(1),
(2) Date: Dec. 7, 2022

(87) PCT Pub. No.: WO2021/250652
PCT Pub. Date: Dec. 16, 2021

(65) Prior Publication Data
US 2023/0224243 A1    Jul. 13, 2023

Related U.S. Application Data

(60) Provisional application No. 63/035,828, filed on Jun. 8, 2020.

(51) Int. Cl.
*H04L 45/00* (2022.01)
*H04L 45/44* (2022.01)

(52) U.S. Cl.
CPC ............. *H04L 45/46* (2013.01); *H04L 45/44* (2013.01)

(58) Field of Classification Search
CPC ......... H04L 45/44; H04L 45/46; H04W 40/32
See application file for complete search history.

(56) References Cited

U.S. PATENT DOCUMENTS

| 8,595,546 B2 | 5/2013 | Dalton |
| 2002/0018448 A1 | 2/2002 | Amis et al. |
| 2003/0204625 A1 | 10/2003 | Cain |
| 2005/0018665 A1* | 1/2005 | Jordan .................... H04L 45/42 370/388 |
| 2011/0130162 A1 | 6/2011 | Park et al. |
| 2017/0366451 A1 | 12/2017 | Schreter |
| 2018/0077229 A1* | 3/2018 | Bharrat ............... H04L 67/1027 |

(Continued)

FOREIGN PATENT DOCUMENTS

| CA | 2719673 A1 | 1/2011 |
| EP | 1978689 A1 | 10/2008 |

(Continued)

*Primary Examiner* — Mansour Oveissi
(74) *Attorney, Agent, or Firm* — FisherBroyles, LLP; Roger L. Browdy; Ronni S. Jillions

(57) ABSTRACT

A distributed routing system is provided for use in a communication network, wherein the distributed routing system includes at least one cluster comprising a first plurality of cluster elements from which a second plurality of cluster elements is selected, wherein each of the cluster elements comprised in the second plurality of cluster elements is configured to operate as a cluster leader candidate and wherein one of that second plurality of cluster elements is selected on a temporary basis to act as cluster leader.

14 Claims, 3 Drawing Sheets

410 — PROVIDING INFORMATION DERIVED FROM REPORTS GENERATED BY ONE OR MORE OF THE CLUSTER ELEMENTS' MANAGERS

420 — INITIATING MESSAGES WITHIN A PERIOD OF TIME DURING WHICH THE SELECTION OF A CLUSTER LEADER TAKES PLACE

430 — BASED ON RESPONSES RECEIVED TO THESE MESSAGES WHICH RELATE TO THE ELIGIBLITY OF THE VARIOUS CLUSTOR LEADER CANDIDATES TO ACT AS A CLUSTER LEADER, SELECTING A CLUSTER LEADER FROM AMONG THESE CLUSTER LEADER CANDIDATES

(56) References Cited

U.S. PATENT DOCUMENTS

| | | |
|---|---|---|
| 2018/0176093 A1 | 6/2018 | Katz et al. |
| 2020/0028750 A1 | 1/2020 | Suresh et al. |
| 2020/0052954 A1 | 2/2020 | Han et al. |

FOREIGN PATENT DOCUMENTS

| | | |
|---|---|---|
| JP | 2014532921 A | 12/2014 |
| WO | 2019/220447 A1 | 11/2019 |

\* cited by examiner

HIGHLY-AVAILABLE CLUSTER LEADER ELECTION IN A DISTRIBUTED ROUTING SYSTEM

TECHNICAL FIELD

The present disclosure relates generally to the field of distributed computing. More specifically, it relates to the operation of a distributed router.

Glossary

BPCE—Backplane Cluster Element.
CE—Cluster Element.
CL—Cluster Leader.
CLC—Cluster Leader Candidate.
CM—Cluster Manager.
EM—Element Manager.
FCE—Forwarding Cluster Element.
LE—Leader Election.
Container—A container is an isolated execution environment that behaves much like a full-featured installation with its own users, file system, processes, libraries, codes, network stacks and the like, that ensures an identical behavior resulting from the software contained within such a container, irrespective of the system in which the container is executed.
Data Plane—A logical layer that encompasses all functions and processes related to the forwarding of data packets/frames from one interface to another through a system. This definition encompasses s among others but not limited to, routing via physical ports as well as via intermediate backplane ports to enable data packets to reach physical ports which are not immediately reachable.
Control—A layer Plane logical that encompasses all applications related to all the functions and processes that determine which path to use, e.g. the management of the data plane. This definition encompasses among others but not limited to, configuration engines, routing stacks, Routing protocols, spanning tree, Idp (Identity Provider), and user-facing services.

BACKGROUND

A distributed system is a system whose components are located on different networked computers, which communicate and messages to one coordinate their actions by forwarding another. The components interact with one another in order to achieve a common goal. Three significant characteristics of distributed systems are: concurrency of components, lack of global clock, and independent failure of components.

A computer program that runs within a distributed system is called a distributed program (and distributed programming is the process of writing such programs). There are many different types of implementations for the message passing mechanism, including pure HTTP, RPC-like connectors and message queues.

A computer cluster is a set of loosely or tightly connected computers that work together so that, in many respects, they can be viewed as a single system. Unlike grid computers, computer clusters have each a node set to perform the same task, controlled and scheduled by a software.

The components of a cluster are usually connected to each other through fast local area networks, with each node (computer used as a server) running its own instance of an operating system. In most circumstances, all of the nodes use the same hardware and the same operating system, although in some setups (e.g. using Open Source Cluster Application Resources (OSCAR)), different operating systems may be used on each computer, or different hardware.

Clusters are usually deployed to improve performance and availability over that of a single computer, while typically being much more cost-effective than single computers of comparable speed or availability.

However, cluster computing technique poses a number of challenges. Two of these challenges stand out: the first being application complexity and the second cluster element synchrony.

The application complexity stems from the distributed nature of computing. For instance, the applied architecture must be one that is able to address the question of how can the network elements be used when the task at hand is being divided therebetween, while ensuring that from the customer application's side, it would still appear that it communicates with a single logical unit.

Element synchrony on the other hand relates to the internal cohesiveness of the system. Every datum unit shared between elements must be synchronized to ensure coherence of the cluster-wide behavior.

Such implementations of cluster computing applications often make use of several methodologies in order to overcome these challenges. Firstly, in a system where the workload management is configured to allow effective load balancing between various CEs, application complexity may be reduced by allowing the CEs to remain as independent as possible. Secondly, a certain centralized entity may be used to handle element synchrony logic and to overlook all CEs. Such a cluster managing entity allows differentiation of cluster-wide information and having it stored as part of the element-local data, and then enables utilizing that information during the cluster operation.

At any given moment only one CM may be active from among the CEs included in the cluster, as several active CMs would indubitably lead to incoherence in the outward-facing cluster behavior. In order to prevent this drawback, the present invention is directed to a solution whereby a cluster leader is elected, using a process that is directed to select a single CE from among all the CEs comprised in a cluster, which then operates as a leader element for that cluster. This leader element will then host the active CM and will carry out all other leader element functionalities required to make the cluster associated therewith, operational.

These issues are exacerbated when the cluster at hand is a router, as different CEs have different responsibilities which, when the CES operate together, provide the full router functionality. The application components in such a cluster can be loosely categorized as belonging to the data plane or to the control plane, each residing within an appropriate CE. The router is thus comprised of CEs, each forming part of the data plane or the control-plane. FIG. 1 illustrates the data-plane CEs in a cluster of this form and how they are connected to a neighbor router. In such a cluster, the control plane must run on exactly one CE that serves as a single source of truth, so it comes naturally that this CE will host the leading CM as part of the control plane services.

For a cluster to remain operational during control-plane CEs failures, there is a need for some redundancy of CEs that can be considered as suitable candidates to replace the cluster leader. These cluster leader candidates (CLCs) must be highly synchronized to allow seamless failover without compromising the routing functionality. It is also imperative that no control-plane services remain running on a CL that is failing. However, this failover should not trigger inter-CLC communication issues, and the LE process should be resilient to minimize control-plane migration instances. Lastly, the LE process needs to handle both CL-loss and CL-failure scenarios, common occurrences in cluster applications.

Commonly accepted deterministic consensus algorithms such as Paxos or Raft have their limitations in a distributed router application. To take the replicated state machine approach in such an environment requires synchronization of the control-plane stack between CLCs. The potential magnitude of data that needs to be synchronized in a router application, might introduce latency issues and might saturate the CLC interconnect. Furthermore, the problem is exacerbated as the number of CLCs increases, introducing a quadratic growth in inter-CLC communication overhead. Another limitation here stems from the fact that unlike common Paxos-like implementations, only the CLCs-a minor subset of all CEs-will participate in such an approach, increasing the risk of instability when one of these few selected CEs fail. Moreover, when most CEs are not CLCs, it would be advantageous for an election algorithm to leverage this fact to increase reliability. Lastly, from a purely applicative perspective, the Paxos-like approach also requires special tailoring of all control-plane applications to this specific design, a task which can be a challenge of its own in a largely software-defined solution.

Given the limitations of prior art approaches, a new solution is required to ensure proper selection of a highly-available cluster leader in distributed router systems.

SUMMARY

The disclosure may be summarized by referring to the appended claims.

It is an object of the present disclosure to provide a novel method and a software for use in communications network which enable proper selection of a highly-available cluster leader in distributed router systems.

It is another object of the present disclosure to provide a novel method and a software use in distributed router systems, composed of Cluster Managers (CMs) running on Cluster Leader Candidates (CLCs), and Element Managers (Ems) running on all Cluster Elements (CEs), whereby reliance on the EMs allows for reliable, highly-available Leader Election (LE), which in turn allows, in distributed routers a seamless, lightweight migration of control-plane services without impact on outward behavior.

Other objects of the present disclosure will become apparent from the following description.

According to a first embodiment of the present disclosure there is provided a distributed routing system for use in a communication network, wherein the distributed routing system includes at least one cluster comprising a first plurality of cluster elements from which a second plurality of cluster elements is selected (i.e., the second plurality of cluster elements being a sub-set of the cluster elements), wherein each of the cluster elements comprised in the second plurality of cluster elements is configured to operate as a cluster leader candidate (CLC) and wherein one of the second plurality of cluster elements is selected on a temporary basis to act as cluster leader (CL).

The term "cluster" as used herein throughout the specification and claims is used to denote a set of loosely or tightly connected computing entities that work together so that, in many respects, they can be viewed as a single system, Computer clusters have each a node set to perform the same task, controlled and scheduled by software.

The term "cluster leader election" or any variation thereof as used herein throughout the specification and claims relates to a process carried out in a distributed system of designating a single entity (or a process) that belongs to a cluster of similar entities, as the organizer of some task distributed among several elements (nodes). Before the task is begun, all network nodes are either unaware which node will serve as the "leader" (or coordinator) of the task, or unable to communicate with the current coordinator. After a leader election algorithm has been executed, each node throughout the network recognizes a particular, unique node as being the task leader.

The term "cluster leader candidate" as used herein throughout the specification and claims relates a physical node that runs the cluster manager software during the leader election (LE) negotiation process, and if it is selected as the node that should operate as the cluster leader, it will operate also the other control plane components.

The term "cluster manager" as used herein throughout the specification and claims refers to a process running on cluster-leader-candidates, namely, designated nodes in the cluster that take part in the leader election (LE) process.

The term "cluster leader" as used herein throughout the specification and claims relates to the elected cluster-leader-candidate node, that contains not only an 'active' cluster manager, but also the remaining of the control plane stack.

It should be noted that even when there is a current elected cluster-leader, the cluster manager process may still run on other cluster-leader-candidates, for continuously monitoring the 'active' cluster manager (the cluster leader). This way, theses other cluster-leader-candidates are still able to respond should current elected cluster-leader fail.

In accordance with another embodiment, the distributed routing system further comprising a managing software configured to manage routing operations within the at least one cluster, and wherein the management software is divided into a plurality of fragments stored at different cluster elements' managers and at the cluster manager.

By yet another embodiment, each fragment belonging to the plurality of fragments, is encompassed within a respective communication container.

According to still another embodiment, the distributed routing system further comprises at least one processor (e.g., associated with a cluster leader candidate, CLC) configured to derive information from reports provided by one or more of the cluster elements' managers (preferably all online cluster elements' managers), wherein the information pertains to which of the cluster elements' managers are associated with the second plurality of cluster elements that are eligible to be selected as cluster leader candidates, based on information derived from each respective one or more cluster elements' managers.

In accordance with another embodiment, the reports are generated on demand and/or upon occurrence of a change in the distributed routing system.

By still another embodiment, the reports belong to one of two distinct types, being reports that pertain to logical state of connections extending to the cluster managers, and reports that pertain to acknowledgements made by a cluster manager of messages that were sent along the connections to that cluster manager.

According to another in case the reports determined to be inconclusive, the at least one processor is further configured to initiate forwarding messages within a period of time during which a cluster leader is selected, wherein the forwarding of the messages is carried out via one or more intermediate cluster elements' managers, and wherein each of the messages is associated with a request to receive information on cluster visibility from the cluster master receiving the message.

In accordance with another embodiment, the at least one processor is further configured to divide the period of time during which a cluster leader is selected into query periods, the lengths of which are set according to the interconnecting capabilities of the cluster leader candidates.

By still another embodiment, the at least one processor is further configured either to accept the cluster state at the end of a query period, or to start another query period if the information received during the preceding query period is insufficient.

In accordance with another aspect of the present disclosure, there is provided a method for selecting a cluster element that will act as a cluster leader in a distributed routing system operative in a communication network, wherein the distributed routing system includes at least one cluster comprising a first plurality of cluster elements from which a second plurality of cluster elements is selected, said method comprises the steps of:

providing information derived from reports generated by one or more of the cluster elements' managers, wherein the information pertains to which cluster elements' managers that belong to the cluster, are eligible to be selected as cluster leader candidates (i.e. eligible to belong to the second plurality of cluster elements), based on information derived from each respective one or more cluster elements' managers;

initiating messages within a period during which the selection of a cluster leader is carried out, wherein each of these messages is associated with a request to receive information on cluster visibility from all cluster elements' managers receiving the respective message; and based on responses received to the messages relating to the eligibility of each of the cluster leader candidates to act as a cluster leader, selecting a cluster leader from among these cluster leader candidates.

According to another embodiment of this aspect of the present disclosure, the reports are generated on demand and/or upon occurrence of a change in the distributed routing system.

By yet another embodiment, the reports belong to one of two distinct types, being reports that pertain to logical state of connections extending to the cluster managers, and reports that pertain to acknowledgements by the cluster leader, of messages that were sent along the connections thereto.

In accordance with still another embodiment, in case the reports are inconclusive, the method further comprising a step of initiating messages within a period during which a cluster leader is selected, wherein the forwarding of the messages is carried out via one or more intermediate cluster elements' managers, and wherein each of the messages is associated with a request to receive information on cluster visibility from the cluster master receiving the message.

According to another embodiment the method further comprising a step of dividing the period during which a cluster leader is selected into query periods, the lengths of which are set according to interconnecting capabilities of the cluster leader candidates.

By yet another embodiment, the method further comprising a step of determining either to accept the cluster state at the end of a query period, or to start another query period if the information received during the preceding query period is insufficient.

BRIEF DESCRIPTION OF THE DRAWINGS

The accompanying drawings, which are incorporated herein and constitute a part of this specification, illustrate several embodiments of the disclosure and, together with the description, serve to explain the principles of the embodiments disclosed herein.

DESCRIPTION OF EXEMPLARY EMBODIMENTS

Some of the specific details and values in the following detailed description refer to certain examples of the disclosure. However, this description is provided only by way of example and is not intended to limit the scope of the invention in any way. As will be appreciated by those skilled in the art, the claimed method and device may be implemented by using other methods that are known in the art per se. In addition, the described embodiments comprise different steps that are carried out, not all of which are required in all embodiments of the invention. The scope of the invention can be summarized by referring to the appended claims.

The present invention aims to provide a new, partially synchronous approach for ensuring that a highly available cluster leader is selected, thereby facilitating the required operations that need to be carried out by that cluster of communication elements.

One of the underlying principles of the present disclosure is the use of timeouts available in control-plane managed protocols. Typically, the time constraints are loose enough to allow full teardown and bring up of the control-plane services between cluster leader candidates (CLCs) without having an adverse effect on peers' states. Any low-latency protocols negotiated over physical interfaces should preferably be handled by the Forwarding Cluster Element (FCE) until the cluster manager (CM) is operational at the elected cluster leader (CL). Consequently, customer-facing behavior remains unaffected by the migration of control-plane services to the new cluster leader.

By relying on nonparticipating CEs, the proposed solution of the present disclosure intends to become resilient to byzantine failures. Should a CE wrongly report a certain CLC as being an unavailable CLC, other CLCs can circumvent the erroneous report by relying on other CEs' reports. On the other hand, should a CE wrongly report a CLC as being available, the CLCs may try to communicate through it to learn the reported CLC's true state.

Through usage of infrequent messages of small size, the proposed solution aims to impose low interconnect overhead. The aforementioned tolerant timeouts obviate the need for mass data store synchronization, thereby facilitating a low-overhead inter-CLC communications protocol.

Lastly, by splitting the leader election (LE) logic between the CM and an element-local application manager, microservices can be added and removed from elements without affecting the LE logic. The splitting of the logic software between EMs and CMS, each encompassed within an appropriate container, ensures avoidance of byzantine failures and at the same time, decoupling of the cluster leader services and the LE logic.

Figure 1:
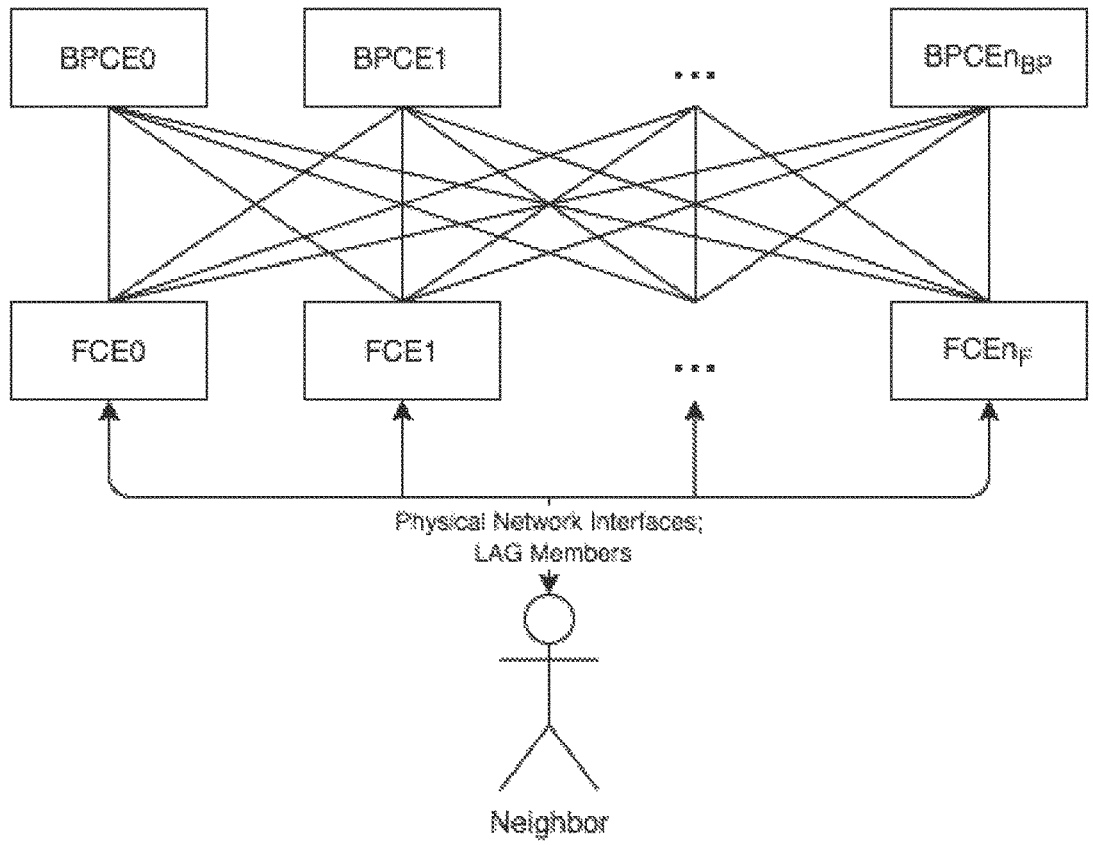
FIG. 1 illustrates a distributed router's traffic-carrying interconnect.
Figure 2:
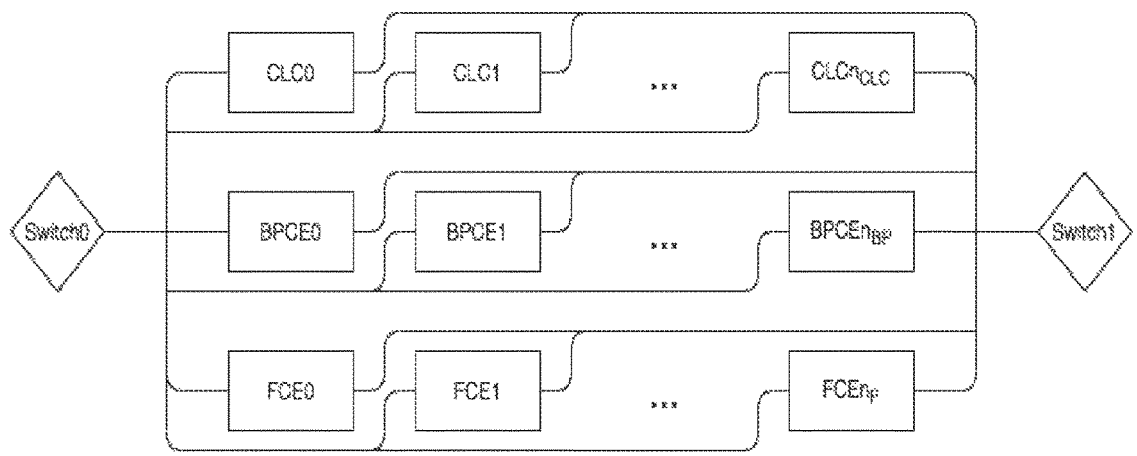
FIG. 2 illustrates a distributed router's internal control traffic-carrying interconnect.

FIG. 2 illustrates an example of a mesh connectivity of CEs that provides such reliability of interconnectivity.

By having a redundancy of switching elements, interconnect availability is maintained during individual switch failure. Furthermore, by querying these switching elements, visibility reports can be generated that also rely on Link Layer Discovery Protocol (LLDP) neighborship.

While CMs run specifically on CLCs to negotiate the identity of the elected cluster leader (CL), they make use of the cluster elements' managers that run on all cluster elements to do so. It is then possible to freely modify the composition of application layers such as the control-plane stack as the LE process, is configuration-agnostic in this regard.

Figure 3:
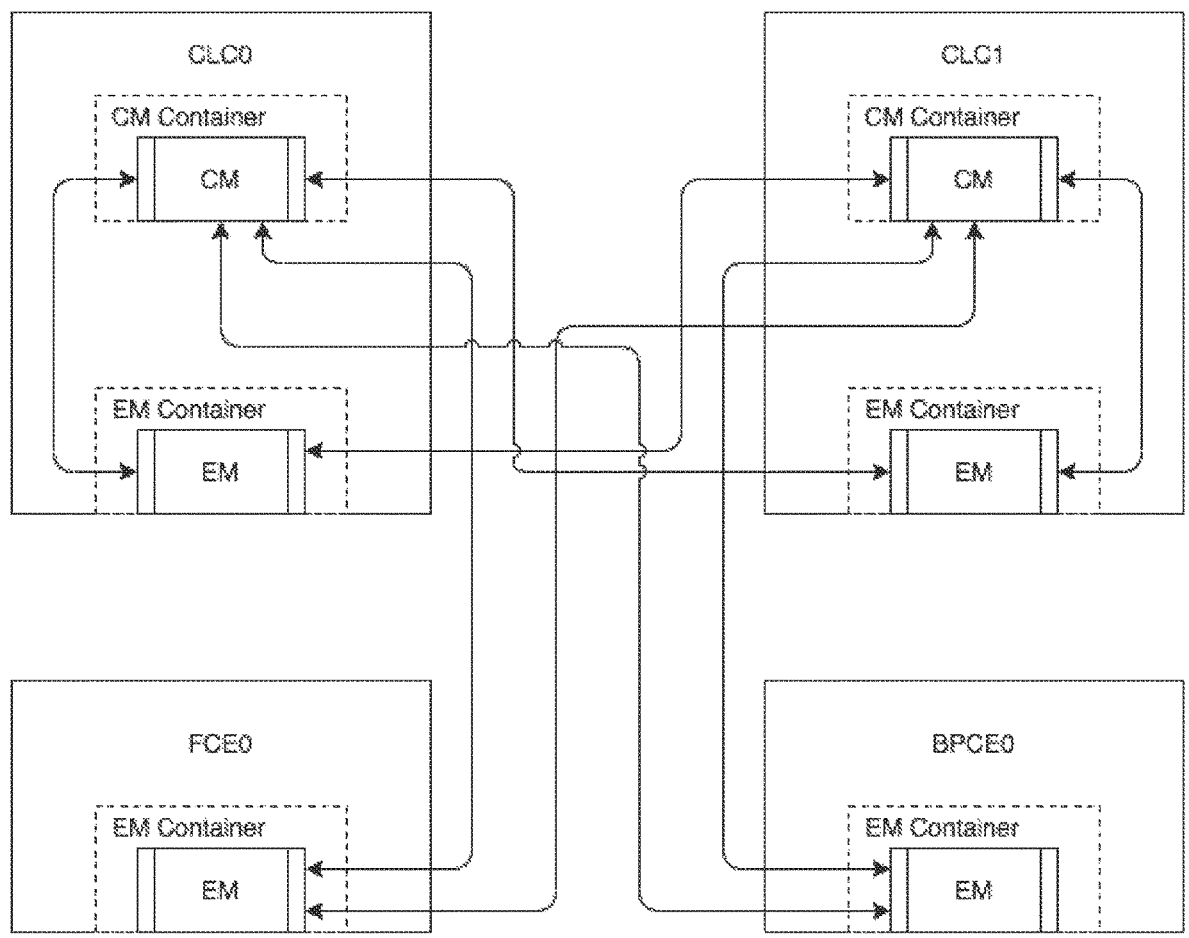
FIG. 3 demonstrates a system architecture that includes various element masters and cluster managers and their connectivity, according to an embodiment of the present invention.

FIG. 3 is used to further clarify the nature of EM-CM relationships. It illustrates the location and relationships of these entities, emphasizing their containerized environment to allow execution alongside other applications on the CEs.

Figure 4:
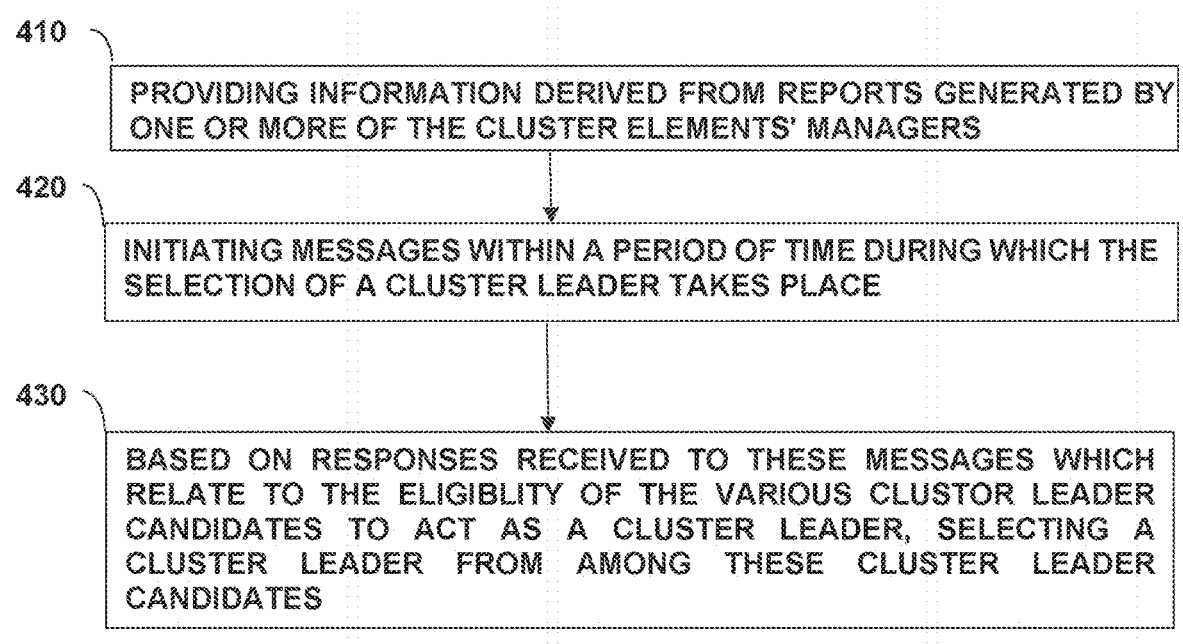
FIG. 4 exemplifies a method for carrying out an embodiment construed in accordance with the present disclosure.

FIG. 4 exemplifies a method construed in accordance with an embodiment of the present disclosure for selecting a cluster leader candidate that will act as a cluster leader in a distributed routing system operative in a communication network.

First, information that has been derived from reports generated by one or more of the cluster elements' managers, is provided (step 410). This information pertains to which CLCs are connected, i.e., which CMs are connected to a given reporting element manager, or in other words which cluster managers are "visible" from each element manager, whether a specific CLC-EM is eligible to become a CL or not, and the identity of the CL, if known. The provisioning of these reports by the elements' managers (EMs) to the cluster managers (CMs), may preferably be affected either on-demand or upon occurrence of certain changes in the cluster elements. Thus, the visibility of the CM of the cluster elements is always up to date.

According to an embodiment of the disclosure, the requests for providing visibility reports, may be classified into two different types, namely, logical and immediate requests. The former type of requests relies on the logical state of the connection to the CM, whereas the latter requests are requests that are sent along certain connections, and the reports generated based on these requests are whether the target CM acknowledged receipt of the respective message, or not.

The next step involves initiating messages within a period during which the selection of a cluster leader is carried out (step 420). Each of these messages is associated with a request to receive information on cluster visibility from a cluster leader candidate receiving the respective message. When the reports received are inconclusive, tally requests between CLCs may be used during LE. The term "tally" as used herein, refers to a continuous count of something, in our case, the number of EMs that are able to confirm that a specific CM is currently active, and by proxy to turn its CLC to the cluster leader (CL).

The messages will be sent through an intermediate EM to each detected CM to request their cluster visibility, comprised of a tally of EM votes for the current leader's identity, to which CMs reply if no other CE request had been made beforehand.

The leader election (LE) period is preferably divided into query periods, the lengths of which are set according to the capabilities of the CLCs' interconnect and with respect to the control-plane routing protocols tolerance, that serve as timeouts for visibility queries, logical or immediate, and at the end of which, either the cluster state is accepted, or rejected. In the latter case, a tally may be issued, or another query period is started if the information received is insufficient.

Finally, based on responses received to these messages relating to the eligibility of each of the cluster leader candidates to act as a cluster leader, selecting a cluster leader from among these cluster leader candidates (step 430). A tally is completed if a CE receives tally replies from most of the approached CMs, that are then informed of the new leader's identity along with all reachable EMs. Should no single CLC receive a greater number of tally responses than all other CLCs, a tally termination is sent to the requested CMs to free them for new tally requests, and a random timeout is imposed before attempting to initiate a new tally. Optionally, a pre-determined criterion may be selected to resolve cases where there is a tie between two (or more) CLCs. For example, it may be determined that in case of such a tie, the CLC which is a node having a lower ID number between the two (or more) CLCs receiving the same numbers of tally responses, would be selected.

The term node "ID number" as used herein relates to the fact that nodes included in the cluster need to have some sort of identification, which may be used in context of the present disclosure, to correlate visibility reports with the reporters making them, but as mentioned above, they may also be used as tiebreakers in the case where votes received by two or more CLCs for becoming a CL, are the same. Typically, there is no requirement for the identifier besides being comparable and unique.

The present invention has been described using detailed descriptions of embodiments thereof that are provided by way of example and are not intended to limit the scope of the invention n any way. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

The invention claimed is:

1. A distributed routing system comprising a plurality of networked computers for use in a communication network, wherein said distributed routing system includes at least one cluster comprising a first plurality of computers being cluster elements from which a second plurality of cluster elements is selected, wherein each of the cluster elements comprised in the second plurality of cluster elements is configured to operate as a cluster leader candidate (CLC) and wherein one of said second plurality of cluster elements is selected on a temporary basis to act as a cluster leader; and at least one processor configured to derive information from reports provided by one or more of a cluster elements' managers, wherein said information pertains to which of the cluster elements' managers that are associated with said second plurality of cluster elements, are eligible to be selected as cluster leader candidates, based on information derived from each respective one or more cluster elements' managers, wherein said at least one processor is configured to initiate messages within a period of time during which the selection of a cluster leader is carried out, wherein each of these messages is associated with a request to receive information on cluster visibility from all cluster elements' managers receiving the respective message; and based on responses received to said messages relating to the eligibility of each of the cluster leader candidates to act as a cluster leader, said at least one processor is further configured to select a cluster leader from among said cluster leader candidates.

2. The distributed routing system of claim 1, further comprising a managing software configured to manage routing operations within said at least one cluster, and wherein said management software is divided into a plurality of fragments stored at different cluster elements' managers and at said cluster manager.

3. The distributed routing system of claim 2, wherein each fragment belonging to said plurality of fragments, is encompassed within a respective communication container.

4. The distributed routing system of claim 1, wherein said reports are generated on demand and/or upon occurrence of a change in said distributed routing system.

5. The distributed routing system of claim 1, wherein said reports belong to one of two distinct types, being reports that pertain to logical state of connections extending to the cluster managers, and reports that pertain to acknowledgements made by the cluster leader, of messages that were sent along said connections to that cluster leader.

6. The distributed routing system of claim 1, wherein in case said reports are inconclusive, said at least one processor is further configured to initiate forwarding messages within a period of time during which a cluster leader is selected, wherein the forwarding of said messages is carried out via one or more intermediate cluster elements' managers, and wherein each of said messages is associated with a request to receive information on cluster visibility from the cluster manager receiving the respective message.

7. The distributed routing system of claim 6, wherein said at least one processor is further configured to divide said period of time during which a cluster leader is selected into query periods, the lengths of which are set according to interconnect capabilities of the cluster leader candidates.

8. The distributed routing system of claim 7, wherein said at least one processor is further configured either to accept the cluster state at the end of a query period, or to start another query period if the information received during the preceding query period is insufficient.

9. A method for selecting a cluster element that will act as a cluster manager in a distributed routing system operative in a communication network, wherein the distributed routing system includes at least one cluster comprising a first plurality of cluster elements from which a second plurality of cluster elements is selected, said method comprises the steps of:

providing information derived from reports generated by one or more of the cluster elements' managers, wherein the information pertains to which of the cluster elements' managers that belong to the cluster, are eligible to be selected as cluster leader candidates, based on information derived from each respective one or more cluster elements' managers;

initiating messages within a period of time during which the selection of a cluster leader is carried out, wherein each of these messages is associated with a request to receive information on cluster visibility from all cluster elements' managers receiving the respective message; and based on responses received to said messages relating to the eligibility of each of the cluster leader candidates to act as a cluster leader, selecting a cluster leader from among these cluster leader candidates.

10. The method of claim 9, wherein the reports are generated on demand and/or upon occurrence of a change in the distributed routing system.

11. The method of claim 9, wherein the reports belong to one of two distinct types, being reports that pertain to logical state of connections extending to the cluster managers, and reports that pertain to acknowledgements made by the cluster leader, of messages that were sent along said connections to that cluster leader.

12. The method of claim 9, wherein in case the reports are inconclusive, the method further comprising a step of initiating forwarding messages within a period of time during which a cluster leader is selected, wherein the forwarding of the messages is carried out via one or more intermediate cluster elements' managers, and wherein each of the messages is associated with a request to receive information on cluster visibility from the cluster manager receiving the message.

13. The method of claim 9, further comprising a step of dividing the period of time during which a cluster leader is selected into query periods, the lengths of which are set according to interconnect capabilities of the cluster leader candidates.

14. The method of claim 9, further comprising a step of determining either to accept the cluster state at the end of a query period, or to start another query period if the information received during the preceding query period is insufficient.

* * * * *